A. W. EDEBORG.
GRIP CHAIN FOR TIRES.
APPLICATION FILED MAY 1, 1917.
1,260,350.
Patented Mar. 26, 1918.
2 SHEETS—SHEET 2.
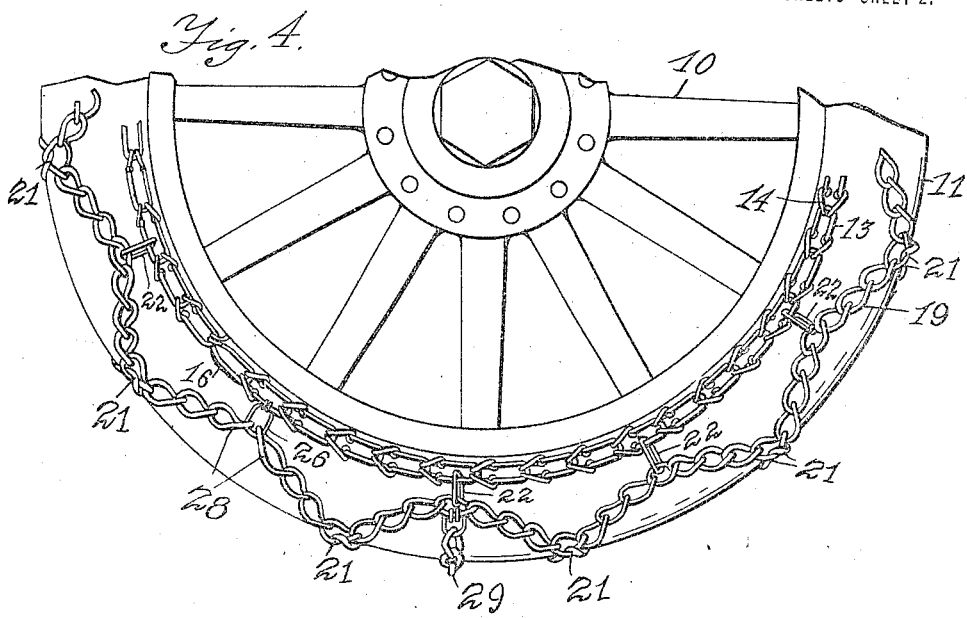
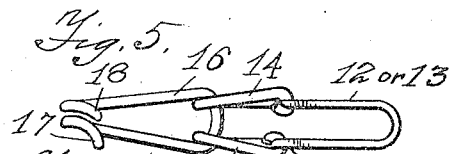
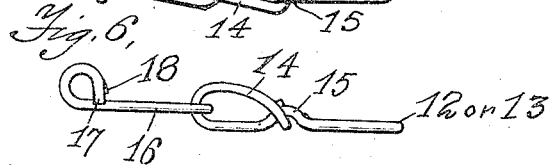
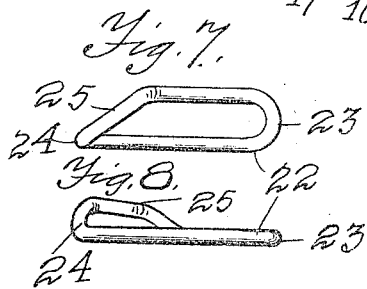
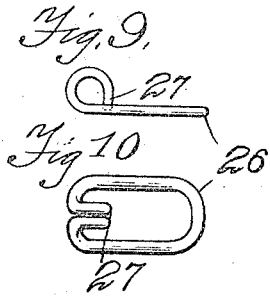
Witness
J. E. Nordstrom
H. A. Sandberg
Inventor
Albert W. Edeborg
By S. Arthur Baldwin
Attorney

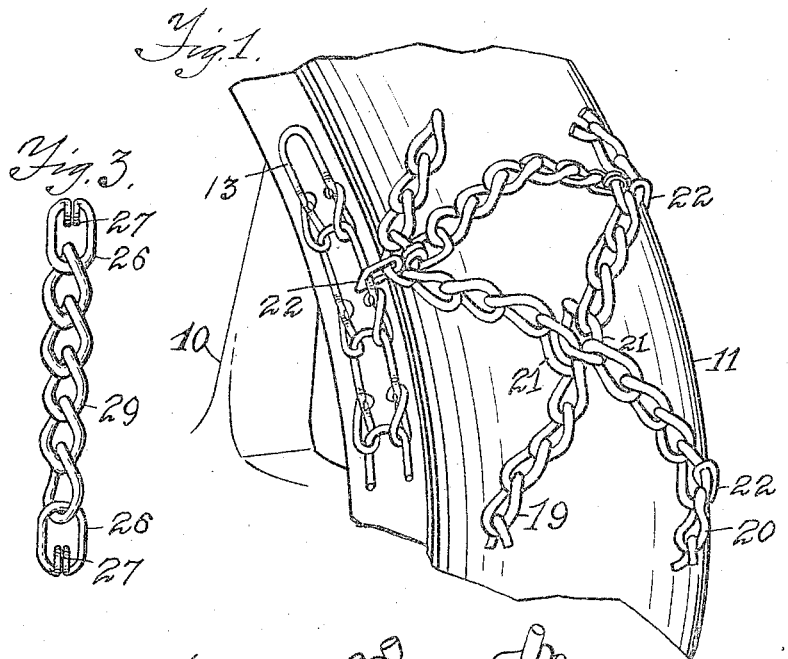
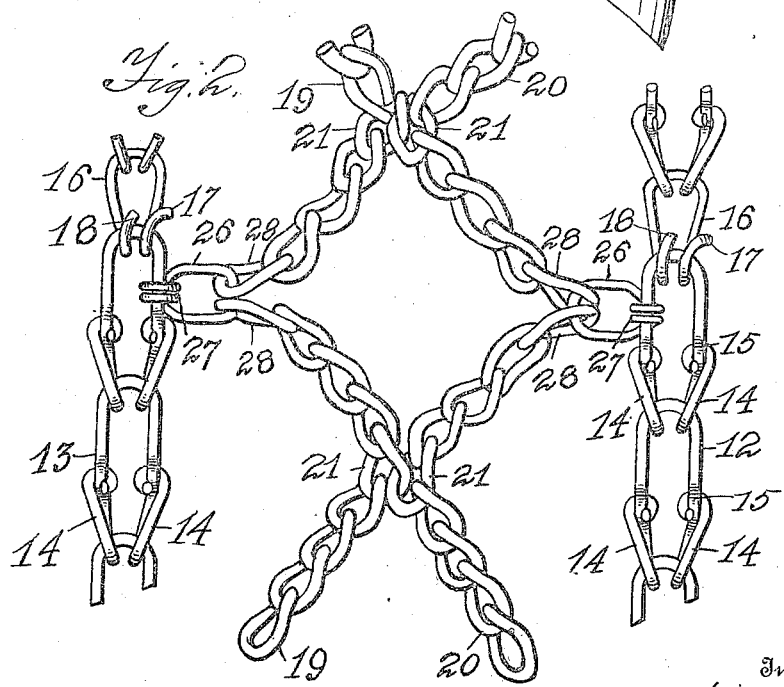

UNITED STATES PATENT OFFICE.

ALBERT W. EDEBORG, OF JAMESTOWN, NEW YORK.

GRIP-CHAIN FOR TIRES.

1,260,850.  Specification of Letters Patent.  Patented Mar. 26, 1918.

Application filed March 1, 1917. Serial No. 151,674.

*To all whom it may concern:*

Be it known that I, ALBERT W. EDEBORG, a citizen of the United States, residing at the city of Jamestown, in the county of Chautauqua and State of New York, have invented certain new and useful Improvements in Grip-Chains for Tires, of which the following, taken in connection with the accompanying drawings, is a specification.

The invention relates to tire chains for obtaining a surer grip on the roadway; and the object of the improvement is to provide a simple and strong construction of tire chain which can be readily assembled and which has detachable portions so as to increase or decrease the gripping capacity of the chain as desired; and the invention consists in the combination and arrangement of the parts as shown in the accompanying drawings and described and claimed in this specification.

In the drawings, Figure 1 is a perspective view of a portion of the wheel and tire with a portion of the chain in position thereon, showing the construction and arrangement of the same. Fig. 2 is a plan view of a portion of the chain spread out to show the manner of attaching the ends of the chain to one another. Fig. 3 is a plan view of one of the detachable cross chains. Fig. 4 is a side elevation of about half of the wheel and tire with the chain attached thereon. Fig. 5 is a top plan view of one of the links of the side chains with a hooked link engaged therein; and Fig. 6 is a side elevation of the same showing the construction and arrangement of each of these links. Fig. 7 is a top plan view of one of the beveled ended links for connecting the central chains to the side chains; and Fig. 8 is a side elevation of the same. Fig. 9 is a side elevation, and Fig. 10 a top plan view of one of the connective hook links for attaching the ends of the central chains to the side chains and also for attaching the cross chains to the central chains.

Like characters of reference refer to corresponding parts in the several views.

The numeral 10 designates the wheel which has the pneumatic or solid rubber tire 11 thereon.

The numerals 12 and 13 designate the side chains which are placed on the opposite sides of the tire 11 and are preferably made with the end portions 14 engaging around the side portions of the links 12 and 13 in the bent sidewise bend 15, to thereby provide a strong link with a flat side which will rest firmly against the side of the tire 11.

Each of the chains 12 and 13 has the hooked link 16 on its end for attaching the two ends of the chain 12 and 13 to one another. The hooked links 16 have the ends 17 and 18 turned as shown to engage the loop of the adjacent end link. The end 17 is made slightly longer than the end 18 extending down a spaced distance from and along side the link 16 so that the end of the link to be engaged therein can be tipped at an angle to engage beneath the longer end 17 and thereby be slipped onto the two ends 17 and 18, both ends having holding engagement on the links attached, thereby firmly attaching the two links so that as they are pressed against the side of the tire they can not disengage from one another or be disengaged by any pulling strain upon the chain from running over the roadway.

The central chains 19 and 20 are preferably made with the common quarter twist link, the two chains 19 and 20 being attached to one another at spaced distances by the interlocking of the links of the adjacent chains, as shown at 21. The two chains 19 and 20 are arranged in the diamond shape formation by the connection of the said chains 19 and 20 to the side chains 12 and 13 about the center of the distance between the connected links 21. The connection of the side chains 12 and 13 is preferably attained throughout the length of the chain by means of a beveled link 22 which has a curved end 23 and at the other end the beveled end 25 with the raised end portion 24 for engagement into a link of the side chains 12 or 13. The raised end 24 so adjusts or arranges each of the links 22 that they lie flat, as shown in Fig. 8, against the side of the tire 11 and permits the link of the chains 12 or 13 to slide freely back and forth in the raised end 24, at the same time providing a curved end 23 into which the links of the chains 19 or 20 may be easily inserted, thereby assembling the entire chain.

The ends of the chains 19 and 20 are attached to one another and to the side chains preferably by means of a hooked link 26 which has the double hooked end 27. The difference between the hooked link 26 and the hooked link 16 is that the hooked link 26 is made sufficiently broad for the attaching end links 28 of the chains 19 and 20 to be inserted in the link 26 and between the hooks 27, which hooks 27, as shown in Fig. 9, extend down nearly to the flat side of the link 26, thereby forming a very secure and firm holding link 26 for the attachment of the two end links 28 to the side links of the side chains 12 and 13.

It often happens that a greater gripping capacity is desired for the chains than that which is normally provided. Accordingly, I have arranged for a removably attached cross chain 29 which is preferably made of the quarter twist links, the same as the central chains 19 and 20 and has attached to each end the hooked link 26 with the hooks 27 in one end, which link can be quickly and easily inserted in the links of the chains 19 and 20 to which the link 22 is attached, as shown in Figs. 1 and 4, thereby providing a detachable cross chain which may be inserted whenever it is desired to increase the gripping capacity of the chain upon the roadway.

In assembling the tire chain it will be realized that I use only four lengthwise pieces of chain, that is, the two side chains 12 and 13 and the center chains 19 and 20, the two center chains being each shaped in the zigzag form by attachment alternately to one another and to the side chains thereby forming the diamond shape pattern around the tire 11. The two forms of hooks 16 and 26 are substantially equivalent to one another, form 16 being used with the side chains because of the ease of attaching the same and the security with which it holds, and the form 26 being used for the sure and perfect attachment of the center chains 19 and 20 to the side chains 12 and 13.

I claim as new:—

1. In a tire chain, a pair of side chains, a pair of continuous central chains, said central chains having the links thereof connected with each other, and links to secure the central chains to the side chains, said links having sides connected by curved ends and having one of their sides extending inwardly at an incline and also upwardly and then downwardly and merging into the other side to provide a pointed nose slidably receiving the links of the side chains.

2. In a tire chain, a pair of side chains, a single pair of unitary central chains extending throughout the circumference of the tire, said central chains being continuous and undulating and having the links of their inwardly extending parts extending longitudinally of the tire and directly interconnected to form a series of antiskid parts at spaced intervals throughout the periphery of the tire, and means to secure the outwardly extending parts of the central chains to the side chains.

3. In a tire chain, a pair of side chains, a pair of unitary central chains extending throughout the circumference of the tire, said central chains being continuous and undulating and having the links of their inwardly extending parts directly interconnected to form a series of anti-skid parts at spaced intervals throughout the periphery of the tire, and means to secure the outwardly extending parts of the central chains to the side chains.

In testimony whereof I have affixed my signature in the presence of two witnesses.

ALBERT W. EDEBORG.

Witnesses:
H. A. SANDBERG,
I. E. NORDSTROM.